April 28, 1964 R. J. FARBER ETAL 3,131,252
ELECTRONIC PREVIEWER FOR THE GRAPHIC ARTS
Filed June 5, 1961
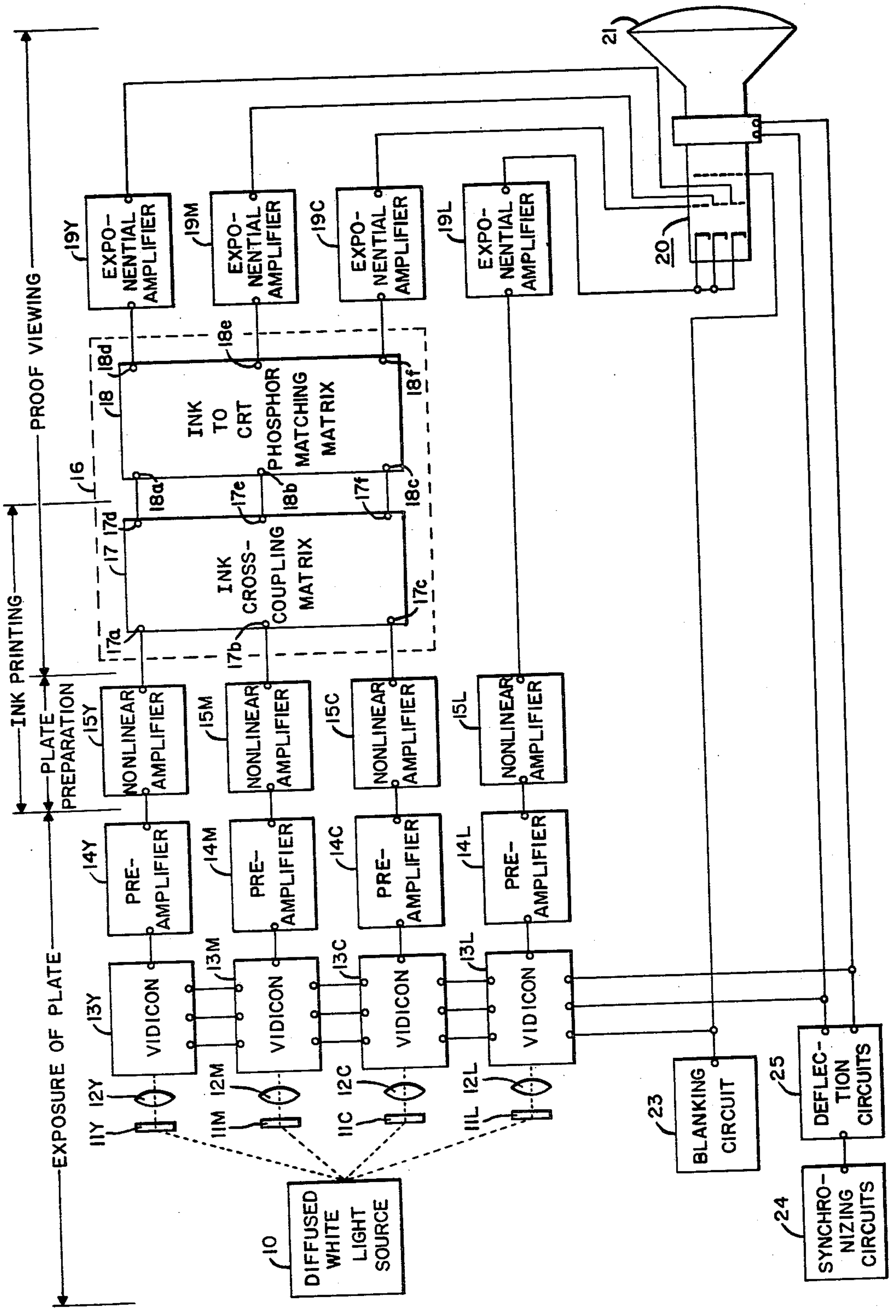

United States Patent Office 3,131,252

Patented Apr. 28, 1964

3,131,252

ELECTRONIC PREVIEWER FOR THE GRAPHIC ARTS

Richard J. Farber, New Hyde Park, and Karl M. St. John, Hicksville, N.Y., assignors to Hazeltine Research, Inc., a corporation of Illinois Filed June 5, 1961, Ser. No. 114,879
11 Claims. (Cl. 178—5.2)

This invention relates to an electronic previewer useful in the graphic arts as a "proofing" machine. More particularly, it relates to a previewer capable of producing from a set of color-separation images an electronic color image simulating that which would normally be obtained by the actual printing of the image on paper from a set of printing plates prepared from these same color-separation images in accordance with a particular type of printing process.

Complete color reproduction processes for the graphic arts, i.e., newspapers, magazines, books, etc., usually may be separated into two distinct steps in the order in which they are performed; namely, the first step of making color-separation images from an original image and the second step of preparing from the color-separation images printing plates used to deposit colored inks in controlled amounts on substantially white paper to form the composite color image. In the first step, three color-separation images are prepared, each consisting of a black-and-white image having a density representative of a particular color in the original image. In four-color printing (three colors plus black), a fourth separation image is developed to have a density representative of the amount of grey in the original image, thus reproducing the brightness or tone variations.

The second step in the color printing process is the one with which the present invention is concerned and includes the preparation of an individual printing plate from each color-separation image. These printing plates are usually made of metal or other durable material, and each one carries, for example, a photo-engraved half-tone image representative of one of the primary color components of the original picture. These color components are typically cyan, magenta, yellow, and, in the case of four-color printing, black; and correspond to the colors of the inks which are printed to form the composite reproduction. Each printing plate is coated with the ink of corresponding color, and the coated plates are successively impressed in register on a sheet of substantially white paper. The resultant overlaid color images together form the composite printed image or picture.

There are several different types of printing processes distinguished by the manner in which the color-separation images are defined in the printing plates. In relief or "letterpress" printing, the image on each plate is elevated relative to the remaining surface, the non-image regions being etched away to a uniform depth. In intaglio or "gravure" printing, the image is depressed relative to the remaining surface, thus forming hollows in which the ink is retained. In "planographic" printing, which is widely used where a relatively limited number of reproductions is required, all areas of the printing plate remain coplanar, the image being distinguished by the presence of an ink-repellent grease in the non-image areas. This latter technique characterizes lithography and photolithography.

At the present time, the cost of printing a color picture is very high, especially if any degree of high quality is desired. One of the major expenses involved in these costs lies in what is known as the "proofing" process which includes the preparation of the printing plates from the color-separation images. As part of this proofing process, it is presently conventional practice for a skilled artisan to inspect the color-separation images, prepared from the original image, for any obvious defects which might be corrected by hand retouching. If the defects are bad enough, it might require the making of new color-separation images incorporating the necessary corrections. Then, the printing plates are prepared from the separation images in accordance with one of the aforementioned types of printing processes, and a set of "proofs" or individual inked impressions of the images on the respective plates are printed on paper. A composite proof may also be made by printing the images in superposition. Then the artisan makes a subjective estimate of what further corrections should be made and proceeds to use acid etching or equivalent techniques in an attempt to alter the relative sizes of the dots in different areas of each plate to the proper degree to effect such corrections in the case of letterpress printing; or the depth of depressions in the case of gravure printing. Another series of proofs is then printed, and the entire procedure is repeated as many times as is necessary to obtain a proof which the artisan considers to be satisfactory.

The entire re-etching operation is very time-consuming and expensive and, in addition, provides results which vary in quality with the experience and skill of the individual artisan. Further, it is well known that the majority of the time and expense in making a satisfactory printed reproduction of an original image is consumed in making corrections in the printing plates after the color separations have been made and that relatively little time and expense is used in precorrecting the color-separation images, principally because the corrections to color-separation images are easier to make than on the printing plates. Also, even if the required corrections are of sufficient magnitude to necessitate making new separation images, the cost of this procedure is much less than reworking the printing plates. Therefore, by providing that all the required corrections are concentrated in the making and retouching of the separation images, the need for making multiple trial printing plates, such as is now being done, where extreme modifications are needed, can be eliminated with consequent substantial savings in cost and printing time.

It is, therefore, an object of the present invention to provide an electronic previewer for the graphic arts which will substantially reduce the cost of producing a printed color picture.

It is also an object of the present invention to provide a previewer which will electronically simulate the physical steps involved in the printing process after a set of color-separation images have been prepared.

It is also an object of the present invention to provide a previewer that can be used in conjunction with presently existing types of electronic scanners to simplify and speed up the process of making color pictures from color-separation images derived from such scanners.

It is further an object of the present invention to provide a proof previewer that instantaneously produces an electronic image corresponding to an actual proof image which would be obtained by the physical process of making proof printing plates and printing the proof image on paper.

It is still further an object of the present invention to provide an electronic previewer that by-passes the physical steps of making trial proof printing plates and that enables the proof printer to make all necessary corrections on the color-separation images, thereby requiring only one set of printed plates to be made for the printing process.

Thus, in accordance with the invention, there is provided an electronic previewer for simulating a color image corresponding to a printed proof which may be obtained from a color-separation image which comprises means for deriving from a color-separation image an electrical signal representative of the transmission density of the separation image. There is also provided means responsive to the transmission density-representative signal for modifying it in accordance with predetermined transfer characteristics associated with the actual making of a printing plate from the separation image and with the depositing of ink by such a plate on a light-reflective medium. Then there is provided means, including an image-reproducing device, responsive to the so-modified signal for converting it to light variations for producing a resultant color image simulating that which would be produced by the aforementioned printing plate in an actual proofing process.

In another aspect of the invention, a composite color image is produced in an electronic previewer comprising means for deriving from a plurality of color-separation images a corresponding plurality of electrical signals, each representative of the transmission density of one of the separation images. These derived signals are then each modified in accordance with the aforementioned predetermined transfer characteristics. The image-reproducing device in this second aspect of the invention is then responsive to the plurality of modified signals for converting them to light variations for producing a composite color image simulating that which would be produced by actual printing plates when used to make a composite proof image.

The single figure of the drawing represents an electronic previewer constructed in accordance with the present invention.

In the drawing, an electronic previewer for simulating a composite color image corresponding to a printed proof which may be obtained from a plurality of color-separation images is shown as including means for deriving from these color-separation images a corresponding plurality of electrical signals, each representative of the transmission density of the respective separation image. This means may include a source 10 of diffused white light uniformly illuminating color-separation images 11Y, 11M, and 11C, respectively representative of the color components yellow, magenta, and cyan in the original image. These color-separation images may be positive or negative transparencies, depending upon the process used in preparing them and, for convenience, they will be referred to broadly, hereinafter, as separation transparencies, In addition, where it is desired to simulate a four-color printing process, as previously described, a fourth separation image, 11L, is provided and is representative of the grey-scale gradations in the original image. The light that passes through the separation images corresponds to the exposure of the undeveloped printing plates to the transparencies in the actual printing process. In the previewer, this light is focused by a lens arrangement represented by lenses 12Y–L on the light-sensitive faces of conventional vidicons 13Y–L. Blanking and deflection signals for the vidicons are provided in conventional manner from units 23, 24, and 25. The vidicons convert the light energy to corresponding electrical signals which are applied to preamplifiers 14Y–L, wherein the signals are raised to suitable levels for use in the ensuing circuits. In addition to the function of converting incident light to electrical signals of suitable amplitudes, each complete unit of a vidicon and preamplifier preferably has an over-all logarithmic signal-translating characteristic for the purpose of converting signals representative of exposure to transmission density-representative signals according to the relationship:

$$D = \log E \qquad (1)$$

where:

$D$ is the signal representative of transmission density of the separation transparency, and $E$ is the signal representative of light exposure which would be produced at the output of the vidicon if the vidicon had a linear response to the incident light.

It will be appreciated that other light-to-signal converting devices than vidicons may be used; image orthocons and iconoscopes being examples of such other devices. Also, a conventional flying-spot scanner and photomultiplier arrangement might be used. However, vidicons, since they have signal outputs which vary generally as the 0.65 power of the incident illumination, most nearly approximate the desired over-all logarithmic characteristic, thereby keeping at a minimum the amount of nonlinearity needed in the preamplifier circuit.

The previewer of the invention is also provided with means responsive to the density-representative signals at the output of preamplifiers 14Y–L for modifying them in accordance with those transfer characteristics, determined in a manner hereinafter described, that are associated with the actual making of printing plates from separation transparencies 11Y–L and with the depositing of inks by such plates on a light-reflective material such as the usual paper used in proof printing. Nonlinear amplifiers 15Y–L are required to ensure that the previewer truly represents the actual printing process, since the physical steps of preparing the plates and depositing inks on paper is not usually a linear process. That is to say, the response of the printing plates during the developing and etching processes and the manner in which these plates deposit inks on paper is a function of density level of incremental regions of the corresponding separation transparency. An example of this departure from effectively linear reproduction is described at pages 42 and 43 of the Kodak Graphic Arts Data Book entitled Kodak Color Separation From Reflection Copy, Eastman Kodak Company. Heretofore, the skilled artisan, in determining the precorrections needed in a transparency for use with a particular printing process, has had to take into account the requisite corrections necessary to compensate for these nonlinearities. It will be appreciated that the precise nonlinear characteristic acquired in any given case will depend upon the printing process being simulated, and, for a given process, can be empirically determined simply by preparing a proof from a sample separation transparency which has a series of incremental areas, each with a different density level, thereby covering the total range of desired densities. Then, by illuminating the trial proof with a standard light source and measuring the amount of reflected light from each density area, the over-all effective translation characteristic corresponding to that particular printing process is readily determined. Of course, once the characteristic is determined for a given process, it is not necessary to repeat the preparation of the trial proof. The design of nonlinear amplifiers is well known, examples of which are shown at pages 222 and 223 of the book Principles of Color Television, by the Hazeltine Laboratories Staff, published by John Wiley & Sons, Inc., 1956.

For true simulation of the process of proof printing, the previewer may also include matrix apparatus 16 primarily for cross-coupling the yellow-, magenta-, and cyan-representative signals from amplifiers 15Y–C to include a simulation of overlapping of the spectral absorption characteristics of the corresponding colored printing inks. In this respect, the colored inks are like dyes used in color photography, in that their spectral absorption characteristics tend to overlap. The principles of matrixing to compensate for overlapping spectral absorption characteristics are fully explained in Patent No. 2,976,348, W. F. Bailey et al., issued March 21, 1961, and entitled "Electronic Previewer for Simulating Image Produced by Photochemical Processing." Briefly, the principle is to determine, from the nature of the ink, the amount of overlapping of the spectral absorption characteristic of a particular color in adjacent spectral regions and then to cross-couple a corresponding amount of signal from a channel representative of that color into the other channel representing the adjacent color on the spectral absorption graph. In other words, the undesired cross-coupling of the spectral absorption characteristics is simulated by intentionally cross-coupling signals between channels in ink cross-coupling matrix 17. Specifically, a portion of the signal representative of the color component yellow at input terminal 17*a* is cross-coupled to appear at the output terminals 17*e* and 17*f* in addition to the principal amount of the signal appearing at output terminal 17*d*. Similarly, the signals at input terminals 17*b* and 17*c* are cross-coupled and appear in controlled proportions at the output terminals 17*d*, 17*e*, and 17*f*.

It will be appreciated that matrix 17 need only be used where it is desired to include a simulation of the above-described cross-coupling of ink spectral absorption characteristics and that it may some times be desired to omit this function, as for example where a single separation transparency is to be previewed. In this event, it may be desirable to provide a suitable switching arrangement to by-pass matrix 17.

The previewer is finally provided with means including an image-reproducing device 20, responsive to the modified signals, for converting them to light variations for producing a resultant color image simulating that which would be produced by the printing plates as though they had actually been prepared and used to print a proof image. Specifically, image-reproducing device 20 may comprise a conventional three-gun color-television tube, on the face of which are colored phosphors corresponding to red, green, and blue. The signals from ink cross-coupling matrix 17 are translated through a matrix 18 and respective exponential amplifiers 19Y–C and coupled to individual ones of the control grids of color-television tube 20; and there is produced, in a conventional manner, the color image on the face 21 of tube 20. Signal blanking and beam deflection are provided in a conventional manner from units 23, 24, and 25.

Matrix 18 and exponential amplifiers 19Y–L are included in the means for producing the color image, matrix 18 operating in a conventional manner to match the signals at the output of matrix 17 to the spectral response characteristics of the respective phosphors in color tube 20. This matching operation is more fully explained at pages 67–76, inclusive, of the aforementioned textbook, Principles of Color Television. The exponential amplifiers are included to convert the density-representative signals to exposure-representative signals, as more fully explained in the aforementioned Bailey et al. patent.

To summarize the operation of the previewer, the color-separation transparencies 11Y–L, which are prepared in accordance with any one of the well-known photomechanical processes for making such transparencies, are inserted in position before the vidicons 13Y–L by the operator of the previewer. The light passing through the respective transparencies is converted to electrical signals representative of the illumination incident on each of the vidicons, which signals are simultaneously converted to transmission density-representative signals by virtue of the logarithmic characteristic of the vidicon-preamplifier combination. These density-representative signals are then modified in nonlinear amplifiers 15Y–L to represent the nonlinear effects introduced by the plate-making and ink-depositing steps. The color representative signals from amplifiers 15Y–C are then further modified in matrix circuit 17 to insert a simulation of the spectral absorption cross-coupling of the printed inks. The cross-coupled signals are then matrixed in matrix circuit 18 to match the color-representative signals to the spectral responses of the colored phosphors in color tube 20. The matrixed color-representative signals at the output of matrix 18 and the black-representative signal from nonlinear amplifier 15L are each modified by respective exponential amplifiers 19Y–L to convert the signals back to exposure-representative signals, which are then reproduced by color tube 20.

Thus, with a previewer constructed in accordance with the present invention, it is merely necessary for the operator to view the face 21 of color tube 20 to see immediately if the transparencies, as they exist, will produce a satisfactory picture for a given plate-making process. There is no need for guessing as to what the final result will be. It will be appreciated that the previewer may be adapted for any desired plate-making process simply by inserting a plurality of nonlinear amplifiers 15Y–L in each signal-translating channel and providing a switching arrangement to select the particular set of nonlinear amplifiers corresponding to the plate-making process to be used. Additionally, at any point in the signal-translating channel, a switching arrangement may be inserted that includes a phase inverter circuit to adapt the previewer for either negative or positive transparencies so that the resultant image on the face of color tube 20 will always be a positive. Also, conventional signal-clamping circuits may be added to each of the channels to ensure that the relative potentials of each signal remain accurate.

While there has been described what is, at present, considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electronic previewer for simulating a color image corresponding to a printed proof which may be obtained from a color-separation image comprising: means for deriving from a color-separation image an electrical signal representative of transmission density of said separation image; means responsive to said signal for modifying it in accordance with predetermined transfer characteristics associated with the actual making of a printing plate from said separation image and with the depositing of ink by said plate on a light-reflective medium; and means including an image-reproducing device responsive to said modified signal for converting it to light variations for producing a resultant color image simulating that which would be produced by said printing plate.

2. An electronic previewer for simulating a color image corresponding to a printed proof which may be obtained from color-separation images comprising: means for deriving from a plurality of color-separation images a corresponding plurality of electrical signals, each representative of the transmission density of one of said separation images; means responsive to said signals for modifying them in accordance with predetermined transfer characteristics associated with the actual making of printing plates from said separation images and with the depositing of colored inks by said plates on paper; and means including an image-reproducing device responsive to said modified signals for converting them to light variations for producing a resultant composite color image simulating that which would be produced by said printing plates.

3. An electronic previewer for simulating a color image corresponding to a printed proof which may be obtained from color-separation images comprising: means for deriving from three color-separation images three electrical signals, each representative of the transmission density of one of said separation images; means responsive to said signals for modifying them in accordance with predetermined transfer characteristics associated with the actual making of printing plates from said separation images and with the depositing of inks by said plates on a light-reflective medium; and means including an image-reproducing device responsive to said modified signals for converting them to light variations for producing a resultant color image simulating that which would be produced by said printing plates.

4. An electronic previewer for simulating a color image corresponding to a printed proof which may be obtained from color-separation images comprising: means for deriving from a plurality of color-separation images a corresponding plurality of electrical signals, each representative of the transmission density of one of said separation images; a plurality of amplifier means having non-linear gain characteristics representative of predetermined transfer characteristics associated with the actual making of printing plates from said separation images and with the depositing of colored inks by said plates on paper and being responsive to said signals for modifying them in accordance with said gain characteristics; and means including an image-reproducing device responsive to said modified signals for converting them to light variations for producing a resultant color image simulating that which would be produced by said printing plates.

5. An electronic previewer for simulating a composite color image corresponding to a printed proof which may be obtained from color-separation images comprising: means, including light-sensitive devices and associated amplifiers, said devices and amplifiers having over-all logarithmic gain characteristics for deriving from a plurality of color-separation images a corresponding plurality of electrical signals, each representative of the transmission density of one of said separation images; means responsive to said signals for modifying them in accordance with predetermined transfer characteristics associated with the actual making of printing plates from said separation images and with the depositing of colored inks by said plates on paper; and means including an image-reproducing device responsive to said modified signals for converting them to light variations for producing a resultant composite color image simulating that which would be produced by said printing plates.

6. An electronic previewer for simulating a color image corresponding to printed proofs which may be obtained from color-separation images comprising: means for deriving from a plurality of color-separation images a corresponding plurality of electrical signals, each representative of the transmission density of one of said separation images; means responsive to said signals for modifying them in accordance with predetermined transfer characteristics associated with the actual making of printing plates from said separation images and with the depositing of colored inks by said plates on paper; and means including a plurality of nonlinear amplifiers and an image-reproducing device, said amplifiers, in conjunction with said device, having over-all exponential gain characteristics and being responsive to said modified signals for converting them to light variations for producing a resultant image simulating that which would be produced by said printing plates.

7. An electronic previewer for simulating a composite color image corresponding to a printed proof which may be obtained from color-separation images comprising: means including light-sensitive electronic scanning devices and associated amplifier circuits, said scanning devices and amplifier circuits having over-all logarithmic gain characteristics for deriving from a plurality of color-separation images a corresponding plurality of electrical signals, each representative of the transmission density of one of said separation images; means responsive to said signals for modifying them in accordance with predetermined transfer characteristics associated with the actual making of printing plates from said separation images and with the depositing of colored inks by said plates on paper; and means including a plurality of nonlinear amplifiers and an image-reproducing device, said nonlinear amplifiers, in conjunction with said image-reproducing device, having over-all exponential gain characteristics and being responsive to said modified signals for converting them to light variations for producing a resultant image simulating that which would be produced by said printing plates made from said separations.

8. An electronic previewer for simulating a color image corresponding to a printed proof which may be obtained from color-separation images comprising: means including light-sensitive devices and associated amplifiers, said devices and amplifiers having over-all logarithmic gain characteristics for deriving from a plurality of color-separation images a corresponding plurality of electrical signals, each representative of the transmission density of one of said separation images; a plurality of amplifier means having nonlinear gain characteristics representative of predetermined transfer characteristics associated with the actual making of printing plates from said separation images and with the depositing of colored inks by said plates on paper and being responsive to said signals for modifying them in accordance with said gain characteristics; and means including an image-reproducing device responsive to said modified signals for converting them to light variations for producing a resultant color image simulating that which would be produced by said printing plates.

9. An electronic previewer for simulating a color image corresponding to a printed proof which may be obtained from color-separation images comprising: means for deriving from a plurality of color-separation images a corresponding plurality of electrical signals, each representative of the transmission density of one of said separation images; means responsive to said signals for modifying them in accordance with predetermined transfer characteristics associated with the actual making of printing plates from said separation images and with the depositing of colored inks by said plates on paper; means for cross-coupling said signals to include a simulation of overlapping of the spectral absorption characteristics of said inks; and means including an image-reproducing device responsive to said modified signals for converting them to light variations for producing a resultant color image simulating that which would be produced by said printing plates.

10. An electronic previewer for simulating a color image corresponding to a printed proof which may be obtained from color-separation images comprising: means for deriving from three color-separation images a corresponding number of electrical signals, each representative of the transmission densities of one of said separation images; means responsive to said signals for modifying them in accordance with predetermined transfer characteristics associated with the actual making of printing plates from said separation images and with the depositing of colored inks by said plates on paper; means for cross-coupling said signals to include a simulation of overlapping of the spectral absorption characteristics of said inks; and means including an image-reproducing device responsive to said modified signals for converting them to light variations for producing a resultant color image simulating that which would be produced by said printing plates.

11. An electronic previewer for simulating a color image corresponding to a printed proof which may be obtained from color-separation images comprising: means including a plurality of light-sensitive scanning devices and associated amplifier circuits, said devices and amplifiers having over-all logarithmic gain characteristics for deriving from a plurality of color-separations a corresponding plurality of electrical signals, each representative of the transmission density of one of said separation images; a plurality of amplifier means having nonlinear signal-translating characteristics representative of predetermined transfer characteristics associated with the actual making of printing plates from said separation images and with the depositing of inks by said plates on paper, said amplifier means being responsive to said signals for modifying them in accordance with said signal-translating characteristics; means for cross-coupling said signals to include a simulation of overlapping of the spectral absorption characteristics of said inks; and means including a plurality of nonlinear amplifier circuits and an image-reproducing device, said amplifiers, in conjunction with said image-reproducing device, having an overall exponential signal-translating characteristic and being responsive to said modified signals for converting them to light variations for producing a resultant image simulating that which would be produced by said printing plates.

References Cited in the file of this patent

UNITED STATES PATENTS

| | | |
|---|---|---|
| 2,757,571 | Loughren | Aug. 7, 1956 |
| 2,976,348 | Bailey et al. | Mar. 21, 1961 |
| 2,977,407 | Hirsch | Mar. 28, 1961 |